United States Patent [19]

Lipschutz

[11] 4,285,574

[45] Aug. 25, 1981

[54] DEVICE FOR READING CODED NOTCHES ON KEYS

[75] Inventor: Paul Lipschutz, Croissy, France

[73] Assignee: Neiman S.A., Courbevoie, France

[21] Appl. No.: 98,452

[22] Filed: Nov. 29, 1979

[30] Foreign Application Priority Data

Dec. 13, 1978 [FR] France ................................ 78 35020

[51] Int. Cl.$^{3}$ .............................................. G02B 27/02

[52] U.S. Cl. .................................................... 350/114

[58] Field of Search ...................... 70/9, 6, 21, 45, 460, 70/91, 454, 237, 239, 249 C, 383 C, 369 C, 453 C, 21, 31, 91, 120

[56] References Cited

U.S. PATENT DOCUMENTS

| | | | |
|---|---|---|---|
| 660,230 | 10/1900 | Treat | 70/9 |
| 1,726,651 | 9/1929 | Coradi | 350/114 |
| 2,030,013 | 2/1936 | Marshall | 350/114 |
| 2,189,825 | 2/1940 | Waugh | 350/114 |
| 3,546,778 | 12/1970 | Lepkowski | 350/114 |
| 3,546,906 | 12/1970 | Yang | 70/21 |

*Primary Examiner*—John K. Corbin
*Assistant Examiner*—B. W. de los Reyes
*Attorney, Agent, or Firm*—James C. Wray

[57] ABSTRACT

A device for reading coded notches on keys, the device comprising a magnifier having parallel lines marked on one face, the lines being spaced apart in accordance with the code and each line being indicated by a coding index, the magnifier having a groove for the reception of a key and an abutment to locate the key in a correct position relative to the lines.

5 Claims, 6 Drawing Figures

DEVICE FOR READING CODED NOTCHES ON KEYS

BACKGROUND TO THE INVENTION

The invention relates to a device for reading the combination of a flat key provided with coded notches on at least one narrow side.

Such keys are used with cylinder locks, especially in the automobile industry. The notches which the key comprises have a variable depth, each depth being associated with a coding index, numeral or letter.

The combination resulting from the set of coding indices, which permits of reproducing the key, is generally marked on the key itself, permitting a third party to gain knowledge of this combination and easily obtain a duplicate of the key.

DESCRIPTION OF PRIOR ART

To remedy this drawback it has been proposed to indicate the combination on a label which the user must destroy after having noted the combination. However the risk of reproduction still exists as regards all persons who have handled the lock before its despatch to the final purchaser. Furthermore experience proves that this user frequently loses the combination.

OBJECT OF THE INVENTION

The present invention aims at permitting easy determination of the combination of a key by means of a small, simple and trouble-free apparatus which can be delivered only to accredited persons, for example the automobile delivery services, who can note in their own books the combination they have read.

SUMMARY OF THE INVENTION

According to the invention there is provided a device for reading the combination of a flat elongated key provided with coded notches on at least one elongated edge, comprising an elongated magnifier of transparent material defined by a curvilinear surface on one side of the magnifier through which the image to be viewed by the user emerges and two substantially planar surfaces on the other side, said planar surfaces being contained in planes substantially parallel to and offset from each other thereby forming between them an elongate abutment shoulder for positioning a key, the combination of which is to be read, a plurality of spaced apart parallel lines provided on one of said planar surfaces and extending longitudinally of the magnifier and positioned near to said shoulder, the spacing of said lines corresponding to the individual key notch depths, and a plurality of coding indices provided on said one planar surface on the side of the spaced parallel lines remote from said shoulder, said indices identifying said parallel lines respectively, whereby when a notched key is placed with a rectilinear portion thereof engaging the abutment shoulder the notched edge of the key is disposed against a background comprising said parallel lines, the coded values of said notches are readable.

In a preferred form of embodiment the said magnifier is constituted by a portion of a frustum of a cylinder of revolution limited by a plane parallel with the axis of revolution, the said marking being carried in the said plane.

BRIEF DESCRIPTION OF DRAWINGS

The invention will be clearly understood on reading of the following description given with reference to the accompanying drawing, wherein.

DESCRIPTION OF PREFERRED EMBODIMENTS

Figure 3:
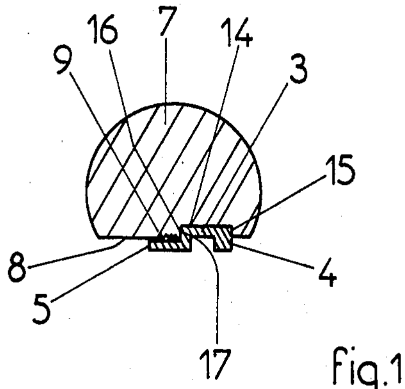
FIG. 3 is a sectional view along the line III—III in FIG. 1.
Figure 2:
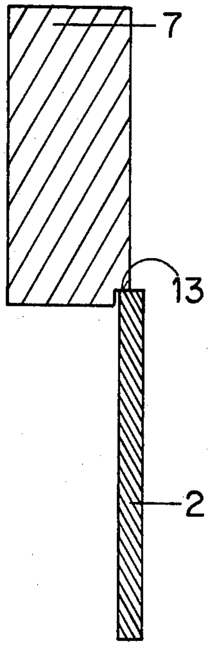
FIG. 2 is a sectional view along the line II—II in FIG. 1.
Figure 1:
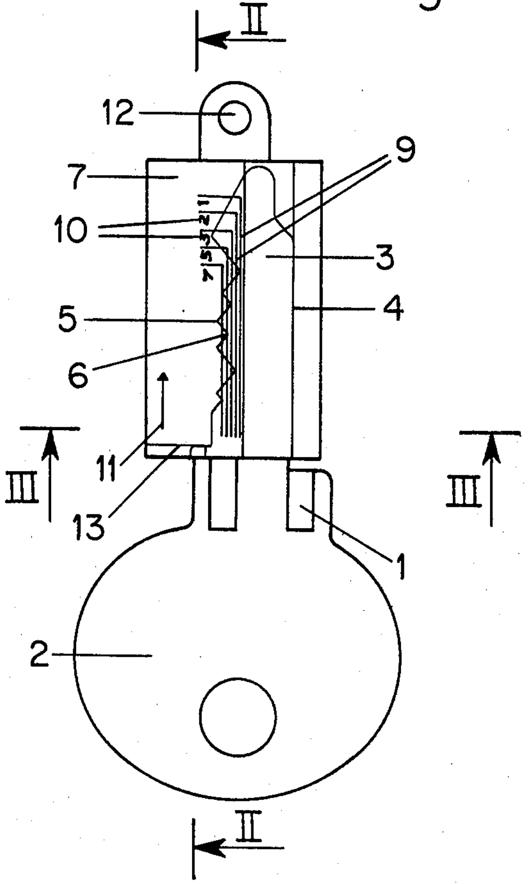
FIG. 1 is a plan view of a device according to one example of embodiment of the invention, adapted to an asymmetrical key, with such a key in the reading position.

Reference will be made firstly to FIGS. 1 to 3 which relate to a form of embodiment of the invention adapted especially to an asymmetrical key 1. Such a key comprises a head 2 connected to a shank 3. The shank 3 has one smooth narrow side 4 while the opposite narrow side 5 has regularly spaced notches 6 of various depths.

The reading device according to the invention is constituted by a magnifier 7 of transparent plastic material having the form of a portion of a frustum of a cylinder of revolution limited by a plane 8 parallel with the axis of the cylinder. On this plane 8 there is entered, preferably by engraving, a marking constituted by parallel lines 9 the spacing of which corresponds to the graduation of the notches 6. Each line 9 is marked by an index 10 indicating the code attributed to the said line. An arrow 11 indicates the direction of reading. A prolongation of the magnifier 7 comprises a hole 12 permitting fitting on a ring, for example for use of the device as key ring.

The plane 8 comprises, opposite to the hole 12, a shoulder 13 serving as abutment co-operating with the zone of the key head 2 adjacent to the shank 3. In the plane 8 there is also formed a longitudinal groove 14 forming two longitudinal shoulders 15 and 16 co-operating respectively with the narrow side 4 of the key 3 and the central rib 17 of the key.

The key 1 is positioned by lodging of its longitudinal rib in the groove 14 and abutment of the head 2 against the shoulder 13. In this position, represented in FIG. 1, the user can see from above, greatly enlarged, the notches 6 superimposed on the lines 9, and thus can read the combination of the key in the order indicated by the arrow 11.

Figure 6:
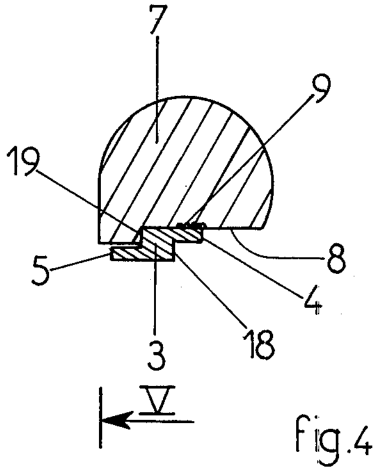
FIG. 6 is a sectional view along the line VI—VI in FIG. 4.
Figure 5:
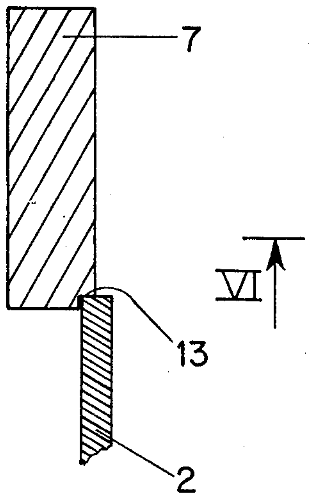
FIG. 5 is a sectional view along the line V—V in FIG. 4.
Figure 4:
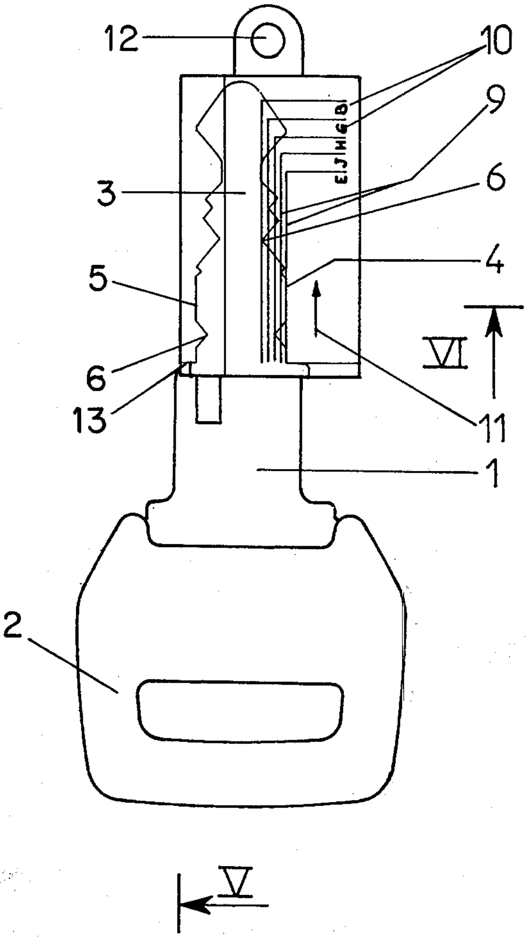
FIG. 4 is analogous with FIG. 1, but for a symmetrical key.

The form of embodiment according to FIGS. 4 to 6 is very similar to that of FIGS. 1 to 3 and the same references designate the same parts. However the shank 3 of the key 1 is symmetrical so that its two narrow sides 4 and 5 are equipped with notches 6. In place of a central rib the shank 3 possesses a longitudinal shoulder 18 offset transversely on each wider side. Consequently the plane 8 of the magnifier comprises a single transversely offset shoulder 19.

I claim:

1. A device for reading the combination of a flat elongated key provided with coded notches on at least one elongated edge, comprising:

(a) an elongated magnifier of transparent material defined by a curvilinear surface on one side of the magnifier through which the image to be viewed by the user emerges and two substantially planar surfaces on the other side, said planar surfaces being contained in planes substantially parallel to and offset from each other thereby forming between them an elongate abutment shoulder for positioning a key, the combination of which is to be read, (b) a plurality of spaced apart parallel lines provided on one of said planar surfaces and extending longitudinally of the magnifier and positioned near to said shoulder, the spacing of said lines corresponding to the individual key notch depths, and (c) a plurality of coding indices provided on said one planar surface on the side of the spaced parallel lines remote from said shoulder, said indices identifying said parallel lines respectively, whereby when a notched key is placed with a rectilinear portion thereof engaging the abutment shoulder the notched edge of the key is disposed against a background comprising said parallel lines, the coded values of said notches are readable.

2. A device according to claim 1, wherein the said magnifier is constituted by a frustum of a cylinder of revolution limited by said planar surfaces disposed parallel to the axis of revolution.

3. A device according to claim 1, wherein said magnifier is provided with a transverse shoulder providing an abutment engageable by a shoulder formed on the notched key.

4. A device according to claim 1, 2 or 3, wherein said plurality of parallel lines are provided on the planar surface nearest the side of the magnifier through which the image emerges.

5. A device according to claim 1, 2 or 3, wherein said plurality of parallel lines are provided on the planar surface farthest from the side of the magnifier through which the image emerges.

* * * * *